Figures 1, 2, 3, 4:
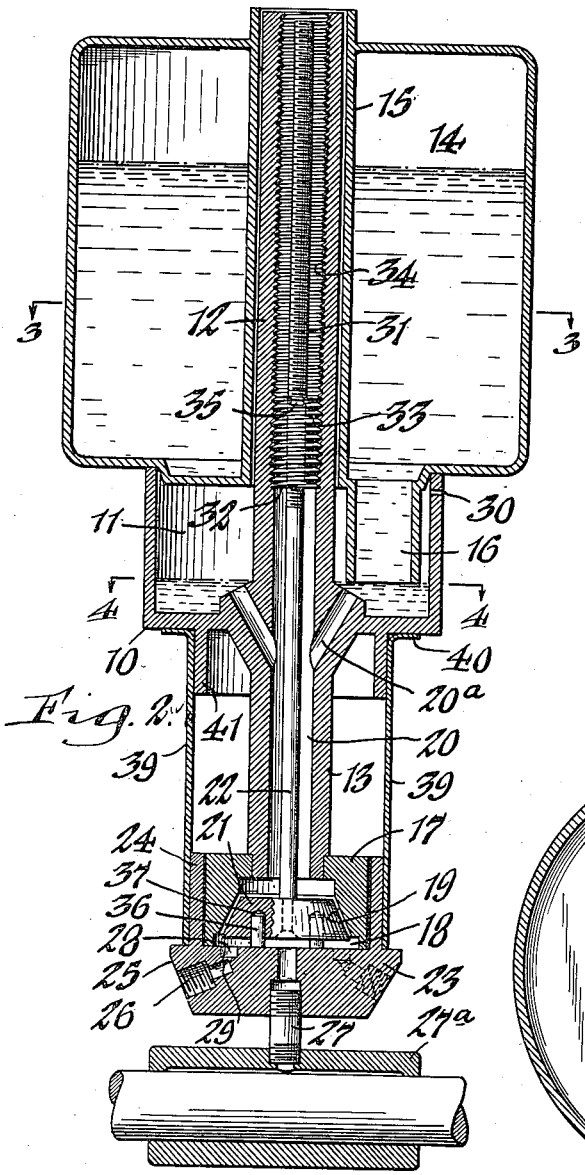

Dec. 27, 1938.   M. C. HAMMOND   2,141,863
AUTOMATIC LUBRICATING DEVICE
Filed April 19, 1935

Inventor,
Mark C. Hammond,
by Walter P. Geyer
Attorney.

Patented Dec. 27, 1938

2,141,863

UNITED STATES PATENT OFFICE 2,141,863

AUTOMATIC LUBRICATING DEVICE

Mark C. Hammond, Bradford, Pa., assignor to Lee Engineering Corporation, Smethport, Pa., a corporation of New York Application April 19, 1935, Serial No. 17,293

13 Claims. (Cl. 184—68)

This invention relates generally to certain new and useful improvements in the art of lubrication but more particularly to an automatic oiler for use on bearings of all kinds.

One of its objects is the provision of a thermostatic oiler of this character which is so designed and constructed as to effectually and positively control the desired flow of lubricant to the bearing in accordance with variable temperature changes, whereby a proper amount of lubricant is delivered to the bearings at all times without waste.

Another object of the invention is to provide an automatically controlled oiler having means for readily adjusting it to deliver a predetermined amount of lubricant to a bearing under normal conditions or to meet varying climatic conditions.

A still further object is the provision of a thermostatically-controlled lubricating device which is simple, compact and inexpensive in construction, which is so designed as to eliminate the element of friction in the operation of its automatically-actuated parts, and which has an adapter means for attaching it readily and conveniently to oil feeds positioned at varying angles to the vertical.

Other features of the invention reside in the construction and arrangement of parts hereinafter described and particularly pointed out in the appended claims.

In the accompanying drawing:—

Figure 1 is a side elevation of the thermostatic oiler embodying my invention. Figure 2 is an enlarged vertical section thereof. Figures 3 and 4 are cross sections taken in the plane of the correspondingly numbered lines in Figure 2.

Similar characters of reference indicate corresponding parts throughout the several views.

In the preferred embodiment of my invention shown in the drawing, the same consists of a body or casing 10 which is disposed in a substantially upright position when in use and which has a lubricant feed compartment or well 11, of substantially cup-shaped form, adjacent its upper end and tubular extensions 12 and 13 extending above and below this compartment in substantially alined axial relation thereto and preferably formed integrally with such compartment. The latter is open at its upper end and detachably mounted thereon in communicating relation therewith is a lubricant-reservoir 14, which rests at its lower side on the upper edge of the compartment 11 and which is provided with a longitudinal opening 15 adapted to fit over the corresponding tubular extension 12 of the casing, in the manner shown in Figure 2. Projecting from its lower end into the compartment 11 the reservoir 14 has a neck or discharge-mouth 16 which opens into the lubricant compartment for conducting the lubricant thereto and for forming a fluid seal therewith, so that when the level of the lubricant in the compartment 11 is at or above the discharge-mouth the lubricant is prevented from being discharged into the reservoir. When the level of the lubricant in the reservoir goes below that of the discharge-mouth, then a further supply of lubricant is discharged from the reservoir into the compartment 11. The reservoir 14 may be readily applied to and removed from the casing and its tubular extension 12, and the latter serves not only to properly guide and position the reservoir in place but prevents its accidental displacement from the casing.

At its lower end, the tubular extension 13 of the lubricant compartment 11 is provided with a valve-containing head or neck 17 having a lubricant-discharge 18 including an upwardly-converging valve-seat 19. This valve seat is disposed axially of the extension 13 and the bore of the latter constitutes a discharge duct 20 which communicates at its upper end with branch ducts 20a opening into the compartment 11. Cooperating with the valve-seat 19 for regulating the control of a predetermined amount of lubricant to a given bearing is an adjustable valve 21 having a stem 22 rising therefrom and extending through the alining casing-extensions 12 and 13.

Applied to the casing-neck 17 is a bearing-adapter preferably in the form of an attaching element or coupling comprising a base 23 and a collar 24 rising therefrom and engaging said casing-neck, whereby the casing 10 is supported in a substantially upright position and may be turned as a unit relative to this adapter for a purpose which will hereinafter appear. There is a slight clearance between the contiguous faces of the neck and collar to permit of the expansion of the neck from the heat of the bearing. In its sides and bottom the base 23 of the adapter is provided with a plurality of different angularly-disposed facets 25 having tapped openings 26 disposed at right angles to the respective facets and which openings are adapted to receive a nipple 27 for detachably connecting the oiling device to the bearing 27a. By the provision of the angularly-disposed openings 26, my oiling device can be conveniently connected in its proper operative position to any bearing nipple irrespective of its angular position to the vertical. In its top side and within the area of the collar 24, the base 23 has a plurality of sockets or depressions 28 corresponding in number to the openings 26 and positioned in intersecting relation to the inner ends thereof, communication between a given opening 26 and its companion socket 28 being prevented by a thin fracturable wall 29 bridging the opposing or intersecting ends of such opening and socket. When it is determined what particular opening 26 is to be used for connecting the oiling device to a given bearing nipple 27, then the bridge wall of that opening is punched out to establish communication between the oiling device and the bearing to be lubricated.

The various parts of the casing 10 are preferably molded from a cellulose acetate composition which has a relatively high heat expansion and which expansion is advantageous in the automatic control of the lubricant to the bearing, the body-neck 17 being in thermal contact with the bearing through the adapter 23. As shown in Figure 2, the oil well 11 has a vent 30 above the oil level thereof.

The valve 21 is suspended from the body 10 and for this purpose the upper portion of its stem 22 is threaded, as indicated at 31 and engages a correspondingly threaded sleeve or nut 32 which is also provided with an external thread 33 engaging the threaded bore 34 of the tubular extension 12. In its top face the sleeve-nut 32 has a kerf 35 for receiving a spanner wrench to effect its adjustment in accordance with the viscosity of the lubricant used for a given bearing and to accordingly effect the proper setting of the valve 21. By preference, the mating threads of the sleeve-nut and valve-stem and those of the sleeve-nut and the threaded bore 34 are such that when the sleeve-nut is adjusted to set the valve for, say, a six-drop discharge of the lubricant, only a slight movement of the valve is effected for a relatively greater movement of the sleeve-nut.

The valve 21 may also be adjusted by rotating the body 10 on its supporting base 23 and to this end the latter has coupling pins 36 rising therefrom which engage corresponding openings 37 in the bottom side of the valve. By this construction, when the body is turned, a relative turning movement is imparted to the valve and due to its threaded connection with the sleeve-nut 32, the valve is accordingly raised or lowered to or from its valve-seat 19 to regulate the valve and govern the desired amount of lubricant to be delivered to the bearing.

For the purpose of supporting the body 10 from the base 23 and yieldingly resisting turning of the body out of a given set position of valve-adjustment, I provide a holder which is preferably in the form of a sleeve 38 fitted at its lower end over the base-collar 24 and having laterally yieldable arms or fingers 39 terminating at their upper ends in lugs 40 disposed in supporting engagement with the body beneath its oil well 11. Depending from the latter about the discharge tube 13 is a skirt or collar 41 with which the holder-fingers 39 frictionally engage with sufficient pressure to resist turning of the body on its supporting base.

As previously stated the body 10 is made of a high heat expansion material so that there is provided a self-contained heat sensitive member in cooperative relation with the valve 21 to automatically govern it to deliver a less or greater amount of lubricant to the bearing depending on the temperature difference between the bearing and that of the atmosphere. When the bearing heats up, the body-neck 17 is expanded laterally to increase the valve-opening and admit a greater amount of lubricant to the bearing. Should the bearing cool down, the reverse conditions take place to thermostatically and automatically govern the amount of oil delivered to the bearing. Should the atmospheric temperature increase, a lateral expansion of the body-neck 17 will increase the valve-opening but the longitudinal expansion of its adjoining tubular portion 13 will tend to close the valve and thereby automatically effect the setting of the valve to a position for delivering the proper amount of lubricant, which has become thinned, to the bearing. Thus, the heat-sensitive body 10 automatically governs the size of the valve-opening, effecting a closing of the valve more under high atmospheric temperature conditions to deliver the same amount of lubricant to the bearing and effecting the opening of the valve a greater amount at lower temperatures to compensate for the difference in the viscosity of the lubricant.

I claim as my invention:—

1. A lubricating device of the character described, comprising a heat-sensitive casing having a lubricant-receiving compartment and a lubricant discharge duct communicating therewith and having a valve-seat therein, a valve adjustable relatively to said seat to regulate the discharge of the lubricant, means for holding the valve against rotation, means for adjusting said valve axially toward and from its seat to regulate the normal flow of lubricant to the bearing, and a coupling in detachable engagement with said casing for connecting the casing in thermal contact with the bearing and for conducting the lubricant to the bearing, whereby the relative movements of the valve and valve-seat are automatically modified in accordance with temperature changes of the bearing, said casing and said valve being of materials having different coefficients of expansion.

2. A lubricating device, comprising a body constituting a self-contained thermostatically-responsive element and having a lubricant-receiving compartment and an attaching neck containing a lubricant-discharge adapted for connection to a bearing, a valve in said neck for controlling said discharge suspended from said body, means for holding said valve against rotation, said valve being automatically movable with the latter to govern the discharge of lubricant in accordance with temperature changes, and means detachably connected to the body-neck and interposed between the latter and the bearing for supporting and connecting said body in thermal contact with the bearing, said body and said valve being of materials having different coefficients of expansion.

3. A lubricating device, comprising a base adapted for attachment to a bearing and having a passage therein discharging into the bearing, a casing rotatably supported on said base against axial displacement and having a lubricant-receiving compartment and a lubricant-discharge in communication with said base-passage, a valve controlling said lubricant-discharge, and an operative connection between the valve and said casing and its supporting base for axially shifting and adjusting the valve in response to the rotation of the casing on said attaching base.

4. A lubricating device, comprising a base adapted for attachment to a bearing and having a passage therein discharging into the bearing, a casing rotatably supported on said base and having a lubricant-receiving compartment and a lubricant-discharge in communication with said base-passage, a valve controlling said lubricant-discharge and including a stem having a threaded connection with said casing whereby said valve is relatively movable to govern said lubricant-discharge, and means operatively connecting said valve with said attaching base to effect an axial, adjustable displacement of the valve in response to the rotation of the casing on said base.

5. A lubricating device, comprising a base adapted for attachment to a bearing and having a passage therein discharging into the bearing, a casing rotatably supported on said base and having a lubricant-receiving compartment and a lubricant-discharge passage in communication with said base-passage, an axially adjustable valve having a screw connection with said casing controlling said lubricant-discharge passage, and coupling pins mounted on said base and engaging corresponding openings in said valve, whereby the latter is adjusted axially in response to the rotation of the casing on the attaching base.

6. A lubricating device, comprising a casing having a lubricant-receiving compartment and a lubricant-discharge passage communicating therewith and having a valve-seat therein, a tubular extension disposed axially of said passage and being internally threaded and having a sleeve-nut fitted therein, and a valve in threaded engagement with said sleeve-nut and adjustable toward and from the valve-seat for controlling the flow of lubricant to the part to be lubricated.

7. A lubricating device, comprising a base adapted for attachment to a bearing and having a passage therein discharging into the bearing, a casing rotatably supported on said base and having a lubricant-receiving compartment and a lubricant-discharge passage communicating therewith and having a valve-seat therein, a tubular extension disposed axially of said passage and being internally threaded and having a sleeve-nut fitted therein, a valve suspended in threaded engagement from said sleeve-nut and adjustable toward and from the valve-seat in response to the turning of the sleeve-nut, and means operatively connecting said valve with said attaching base to effect the adjustment of the valve in response to the rotation of the casing on said base.

8. A lubricating device, comprising a base adapted for attachment to a bearing and having a passage therein discharging into the bearing, a casing rotatably supported on said base against axial displacement and having a lubricant-receiving compartment and a lubricant-discharge passage in communication with said base-passage, a valve controlling said lubricant-discharge passage, means for effecting the axial adjustment of the valve in response to the rotation of the casing on the attaching base, and means for frictionally resisting the rotation of said casing out of a given set position.

9. A lubricating device, comprising a base adapted for attachment to a bearing and having a passage therein discharging into the bearing, a casing rotatably supported on said base against axial displacement and having a lubricant-receiving compartment and a lubricant-discharge passage in communication with said base-passage, a valve controlling said lubricant-discharge passage, means for effecting the axial adjustment of the valve in response to the rotation of the casing on the attaching base, and a holder applied to said base in supporting engagement with said casing.

10. A lubricating device, comprising a base adapted for attachment to a bearing and having a bearing-nipple passage therein and a collar rising from said base, the inlet end of said passage opening into the top side of the base within the confines of its collar, a rotatable casing supported on said base and having a lubricant-receiving compartment and a lubricant discharge tube terminating at its lower end in a neck rotatably fitted in said base-collar, said neck having a valve-seat therein, a valve movable relatively to said seat to control the delivery of lubricant to the bearing, an operative connection between the valve and said casing and its supporting base for adjusting said valve in response to the rotation of the casing on said base, and a holder rising from said base-collar in supporting engagement with said casing and including resilient fingers for resisting the rotation of the casing out of a given set position.

11. A lubricating device, comprising a casing having a lubricant-receiving compartment and a valve-containing neck having a lubricant-discharge including an upwardly-converging valve-seat and adapted for communication with a bearing, said casing being capable of expansion and contraction in accordance with temperature changes, and a valve suspended from said casing and housed in said neck and movable relatively to said valve-seat to control the flow of lubricant independent of atmospheric temperature and in accordance with the expansion and contraction of the casing, the latter and said valve being of materials having different coefficients of expansion.

12. A lubricating device, comprising a casing having a lubricant-receiving compartment at one end and an attaching neck at its other end containing an upwardly-converging valve-controlled discharge and adapted for connection to a bearing in thermal contact therewith, said casing being of a material having a high heat expansive quality and capable of expansion and contraction in accordance with temperature changes, and an upwardly-closing valve housed in said attaching neck for controlling said discharge and suspended from said casing to be governed thereby in controlling the discharge of lubricant independent of varying conditions of atmospheric temperature, the casing and the valve being of materials having different coefficients of expansion.

13. A lubricating device, comprising a casing having a lubricant-receiving compartment at its upper end and a communicating attaching neck at its lower end containing a valve-controlled discharge and adapted for connection to a bearing in thermal contact therewith, said neck being capable of expansion and contraction in response to the temperature changes of the bearing, and a valve for controlling said discharge suspended from said casing, said valve and said casing and its neck being of materials having different coefficients of expansion and being relatively movable to increase or decrease the size of the discharge to thereby deliver the same amount of lubricant irrespective of atmospheric temperature and a proportionate amount of lubricant in accordance with the bearing temperature.

MARK C. HAMMOND.